(12) United States Patent
Mitchell et al.

(10) Patent No.: US 7,473,726 B2
(45) Date of Patent: Jan. 6, 2009

(54) FIRE-RESISTANT POLYAMIDE COMPOSITION

(75) Inventors: James Mitchell, Saint Priest (FR); Daniele Galli, Mariano Comense (IT)

(73) Assignee: Rhodia Engineering Plastics S.R.L., Ceriano Laghetto (MI) (IT)

(*) Notice: Subject to any disclaimer, the term of this patent is extended or adjusted under 35 U.S.C. 154(b) by 438 days.

(21) Appl. No.: 10/524,565

(22) PCT Filed: Aug. 8, 2003

(86) PCT No.: PCT/FR03/02497

§ 371 (c)(1),
(2), (4) Date: Sep. 26, 2005

(87) PCT Pub. No.: WO2004/016684

PCT Pub. Date: Feb. 26, 2004

(65) Prior Publication Data

US 2006/0111483 A1    May 25, 2006

(30) Foreign Application Priority Data

Aug. 13, 2002   (FR) ................... 02 10273

(51) Int. Cl.
*C08K 5/5313*   (2006.01)
*C08K 5/3477*   (2006.01)

(52) U.S. Cl. .................. 524/126; 524/99; 524/100; 524/133; 524/140

(58) Field of Classification Search ............ 524/99, 524/100, 126, 133
See application file for complete search history.

(56) References Cited

U.S. PATENT DOCUMENTS 6,160,080 A * 12/2000 Cucinella et al. ............ 528/170
6,255,371 B1   7/2001 Schlosser et al.
2001/0007888 A1 * 7/2001 Asano ........................ 524/115

FOREIGN PATENT DOCUMENTS

WO   WO 9724388       7/1997
WO   WO 0228953 A1    4/2002

* cited by examiner

*Primary Examiner*—Peter Szekely
(74) *Attorney, Agent, or Firm*—Buchanan, Ingersoll & Rooney, PC

(57) ABSTRACT

The invention relates to a fire-resistant composition containing at least one star polyamide and a flame retardancy system comprising a phosphinate and a melamine reaction product. The inventive composition can be used to produce elements having a low flame-spread rating upon combustion as well as satisfactory mechanical properties. Said composition is particularly suitable for producing molded elements that are used in the field of electrical and electronic connector technology.

16 Claims, No Drawings

FIRE-RESISTANT POLYAMIDE COMPOSITION

This application is an application under 35 U.S.C. Section 371 of International Application Number PCT/FR2003/002497 filed on Aug. 08, 2003.

The present invention relates to a fire-resistant composition comprising at least one star polyamide and a fire-resistant system comprising a phosphinate and a melamine reaction product. Such a composition makes it possible to obtain articles with low fire propagation when they come into combustion, and also satisfactory mechanical properties. This composition is especially useful for making molded articles used in the field of electrical or electronic connection.

Polyamide resin-based compositions are used for making articles via various forming processes. These articles are used in many technical fields.

Among these, the production of components of electrical or electronic systems is an important application requiring specific properties. Thus, these components must have high mechanical properties, but also chemical resistance and electrical insulation properties, and also good fire resistance when these components come into combustion.

The fire resistance of linear polyamide resin-based compositions has been studied for a very long time. Thus, the main fire-resistant agents used are red phosphorus, halogenated compounds such as polybromodiphenyls, polybromodiphenoxides and brominated polystyrenes, organonitrogen compounds belonging to the triazine class, such as melamine or derivatives thereof, for instance melamine cyanurate and more recently melamine phosphates, polyphosphates and pyrophosphates, organophosphorous acids and salts thereof, in particular in combination with thermoplastic polymers, such as linear polyamides (DE-A-2 252 258, DE-A-2 447 727 and U.S. Pat. No. 6,255,371).

There is ongoing research into fire-resistant agents that have increasingly high fire resistance properties. Moreover, fire-resistant agents, which are generally used in large amounts, lead to problems of forming of components. Furthermore, certain fire-resistant agents containing halogens or red phosphorus may generate toxic gases or vapors during the combustion of the polyamide composition. In addition, fire-resistant agents are known to be unstable at high temperatures. Thus, a portion of the fire-resistant agents degrades during the polyamide manufacturing process, thus reducing their fire-resistant efficacy.

There is thus a need for polyamide-based compositions for making articles that have satisfactory mechanical properties and good fire resistance, while at the same time avoiding the drawbacks mentioned above.

The present invention relates to a composition comprising at least:

a) a star polyamide-based polyamide matrix comprising at least macromolecular chains of formula (I):

$$R_1-[-A-X-(-Y-R_2-Z-)_n-R_3]_m \quad (I)$$

and optionally macromolecular chains of formula (II):

$$R_4-[-Y-R_2-Z-]_p-R_3 \quad (II)$$

in which:
Y is the radical:

when X and Z represent the radical:

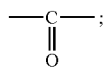

Y is the radical:

when X and Z represent the radical:

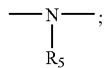

A is a covalent bond or an aliphatic hydrocarbon-based radical possibly comprising hetero atoms and comprising from 1 to 20 carbon atoms and preferably from 1 to 10 carbon atoms;

$R_1$ is a linear or cyclic, aromatic or aliphatic hydrocarbon-based radical comprising at least 2 carbon atoms, preferably from 2 to 6 carbon atoms, and possibly comprising hetero atoms;

$R_2$ is an aliphatic or aromatic, branched or unbranched hydrocarbon-based radical comprising from 2 to 20 carbon atoms and preferably from 6 to 12 carbon atoms;

$R_3$ and $R_4$ independently represent hydrogen, an —OH radical and/or a hydrocarbon-based radical comprising at least one group:

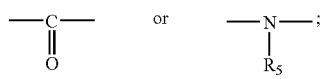

$R_5$ represents hydrogen or a hydrocarbon-based radical especially comprising from 1 to 6 carbon atoms;

m represents an integer between 3 and 8 and preferably between 3 and 4 (limits inclusive);

n represents an integer between 50 and 200, preferably between 100 and 200 and particularly between 150 and 200 (limits inclusive); and p represents an integer between 50 and 200, preferably between 100 and 200 and particularly between 150 and 200 (limits inclusive); and b) a fire-resistant composition comprising at least;
a compound (F1) of formula (VI):

R₆ and R₇ are identical or different and represent a linear or branched alkyl chain comprising from 1 to 6 carbon atoms and preferably from 1 to 3 carbon atoms, and/or an aryl radical;

M represents a calcium, magnesium, aluminum and/or zinc ion and preferably a magnesium and/or aluminum ion;

Z represents 2 or 3, preferably 3; and a compound (F2), which is a product of reaction between phosphoric acid and melamine and/or a product of reaction between phosphoric acid and a condensed melamine product.

The star polyamide according to the invention is especially described in U.S. Pat. No. 6,160,080, which is cited herein by way of reference.

The Applicant has discovered, entirely surprisingly, that the star polyamides and the particular fire-resistant system according to the invention act synergetically in the composition, making it possible to obtain articles with a low flame propagation, good mechanical properties and good heat stability when compared with the compositions of the prior art comprising linear polyamides.

Preferably, the composition according to the invention comprises from 30% to 99% by weight and preferably from 30% to 77% by weight of star polyamide relative to the total weight of the composition.

The radical $R_1$ may be a radical chosen from the cycloaliphatic, arylaliphatic and linear aliphatic group. Preferably, in this case, the mass ratio between the weight of polymer chains of formula (I) and the total weight of polymer chains of formulae (I) and (II) is between 0.10 and 1. The radical $R_1$ may be an aromatic radical. Preferably, in this case, the mass ratio between the weight of polymer chains of formula (I) and the total weight of polymer chains of formulae (I) and (II) is less than 1 and preferably less than 0.9. $R_1$ may represent a radical chosen from the cyclohexanonetetrayl radical, the 1,1,1-triylpropane radical, the 1,2,3-triylpropane radical and the radical:

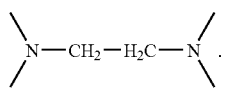

As other radicals $R_1$ that are suitable for the invention, examples that may be mentioned include substituted or unsubstituted trivalent phenyl and cyclohexanyl radicals, tetravalent diaminopolymethylene radicals with a number of methylene groups advantageously of between 2 and 12, such as the radical derived from EDTA (ethylenediaminetetracetic acid), octavalent cyclohexanonyl or cyclohexadinonyl radicals, and radicals derived from compounds originating from the reaction of polyols such as glycol, pentaerythritol, sorbitol or mannitol with acrylonitrile.

Generally, the radicals $R_2$ are amino acid or lactam residues. $R_2$ may be a pentamethylene radical. In this embodiment, the polyamide has a structure of polycaproamide or PA 6 type. Other radicals $R_2$ may be used, such as undecamethylene radicals, which lead to a polyamide with a PA 12 type structure. It is also possible to obtain polyamides containing radicals $R_2$ comprising 8 or 10 carbon atoms, corresponding, respectively, to polyamides of PA 9 and PA 11 type structure.

The radical A is preferably a methylene or polymethylene radical such as ethyl, propyl or butyl radicals, or a polyoxyalkylene radical such as the polyoxyethylene radical.

As mentioned previously, $R_3$ and $R_4$ may represent a hydrogen atom and/or an —OH radical. It is understood that $R_3$ may represent an —OH radical when Z represents a radical

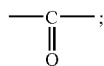

and $R_4$ may represent an —OH radical when Y represents a radical

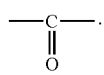

Similarly, $R_3$ may represent a hydrogen atom when Z represents a radical

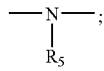

and $R_4$ may represent a hydrogen atom when Y represents a radical

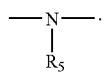

$R_3$ and $R_4$ may also represent a hydrocarbon-based radical, preferably containing from 1 to 10 carbon atoms, comprising at least one group:

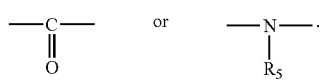

Preferably, $R_3$ and $R_4$ represent a hydrocarbon-based radical comprising at least one group:

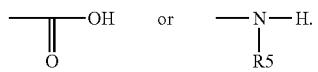

Thus, the polymer chains of formula (I) define a star polyamide comprising polyamide branches of PA 6 type in one of the preferred embodiments of the invention, and a central core consisting of a cycloaliphatic nucleus.

These polymer chains of formula (I) are, in one of the preferred modes of the invention, mixed with linear polyamide chains of formula (II). The length or the molecular weight of the linear chains of formula (II) or of the branches of the star polyamide may be high. Thus, the linear polymer, for instance the chain of each branch of the star polymer, has an $\overline{Mn}$ advantageously greater than 5000.

Preferably, the star polyamide according to the invention is obtained at least from the monomers of formula:

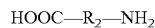 (III)

and/or a lactam of formula:

  (IV)

in the presence of a polyfunctional compound of formula (V):

$$R_1-[-A-X-H]_m \quad (V)$$

in which A, X, $R_1$, $R_2$, $R_5$ and m are as defined above, optionally in the presence of a polycondensation-initiating compound.

The reactive function of the polyfunctional compound of formula (V) represented by the symbol X—H is a function capable of forming an amide function, i.e., for example, an acid or amine function. The preferred compounds of formula (V) are as follows:

The polycondensation initiator may be water, a mineral or carboxylic acid and/or a primary amine. This compound is advantageously added to obtain a weight concentration of between 0.5% and 5% by weight relative to the total mixture.

By way of example, the polyfunctional compound of formula (V) may be chosen from the group comprising the compound 2,2,6,6-tetra(β-carboxyethyl)cyclohexanone, the compound diaminopropane-N,N,N',N'-tetraacetic acid, the triamines sold under the name Jeffamines T®, and obtained by reaction of propylene oxide with trimethylolpropane or glycerol and amination of the hydroxide ends.

These triamines are sold under the commercial name Jeffamines T® by the company Huntsman, and have the general formula:

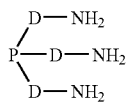

in which:
P represents a 1,1,1-triylpropane or 1,2,3-triylpropane radical, and
D represents a polyoxyethylene radical.

0.1 mol % to 2 mol % and preferably 0.3 mol % to 1 mol % of polyfunctional compound of formula (V) may be used relative to the total number of moles of the polyamide obtained.

The polycondensation may be performed according to the standard operating conditions for the polycondensation of amino acids or lactams of formula (III) or (IV), when this is performed in the absence of the multifunctional compound of formula (V).

Thus, the polycondensation process may briefly comprise:
heating, with stirring and under pressure, of the monomer mixture: compounds of formula (III) and/or (IV) and of the compound of formula (V) with the initiator (generally water),
maintenance of the mixture at this temperature for a given time, followed by decompression and maintenance under a stream of inert gas (for example nitrogen) for a given time at a temperature above the melting point of the mixture, in order thus to continue the polycondensation by removal of the water formed.

According to the process of the invention, the time of maintenance under inert gas, or, in other words, of finishing of the polycondensation, makes it possible to determine and control the concentration of polymer chains of formula (I) in the polyamide blend. Thus, the longer the maintenance time, the higher the concentration of polymer chains of formula (I).

It is also obvious that the concentration of polymer chains of formula (I) or star polyamide depends on the amount of multifunctional compound of formula (V) added to the mixture.

It is also possible, without, however, departing from the scope of the invention, to add to the polycondensation mixture other monomers comprising functions capable of forming amide functions, in order thus to obtain modified polyamides or copolyamides. Diacid or diamine monomers may be added at a weight concentration of less than 20% relative to the total mixture.

After polycondensation, the polymer is advantageously cooled with water, and extruded in the form of a rod. These rods are chopped to produce granules.

To remove the non-polycondensed monomers, especially in the case where one of the monomers is caprolactam, the granules may be washed with water and then dried under vacuum.

Other polymers, such as polyamides, for instance linear polyamides, may be added to the polyamide-based matrix. Any type of polyamide may be used to perform the invention, for example polyamides of the type obtained by polycondensation of a diamine with a dicarboxylic acid, such as polyamide 66, or polyamides of the type obtained by polycondensation of amino acids or lactams, such as polyamide 6. Polyamide 6, polyamide 11, polyamide 12, copolyamides 6/6.6 and 6/6.36, and blends and copolymers based on these polyamides or copolyamides, are most particularly preferred.

As the star polyamide in accordance with the invention has a melt flow index that is higher than that of the known linear polyamides, for similar molecular masses and mechanical properties, the charged composition may be injected more easily into a mold, i.e. at higher working speeds. It also makes it possible to obtain more homogeneous and more complete filling of the molds, especially when they have a complex shape.

The fire-resistant system according to the present invention comprises the compounds F1 and F2. Such a fire-resistant system is especially described in U.S. Pat. No. 6,255,371. The composition may comprise from 1% to 70%, preferably from 5% to 40%, even more preferably from 10% to 30% and particularly from 15% to 30% by weight of the fire-resistant system according to the invention, relative to the total weight of the composition. Preferably, the weight ratio of the compounds F1 and F2 is respectively between 1:1 and 4:1 and preferably of about 3:2.

$R_6$ and $R_7$ of compound F1 of formula (VI) may be identical or different and represent a methyl, ethyl, n-propyl, isopropyl, n-butyl, tert-butyl, n-pentyl and/or aryl, for example such as a phenyl. M is preferably an aluminum ion. The phosphinic acid of compound F1 may be chosen, for example, from the group consisting of dimethylphosphinic acid, ethylmethylphosphinic acid, diethylphosphinic acid and methyl-n-propylphosphinic acid, or a mixture thereof.

Various phosphonic acids may be used in combination.

The phosphinic acid salts according to the invention may be prepared according to the usual methods that are well known to those skilled in the art, for instance the method described in patent EP 0 699 708. The phosphinic acid salts according to the invention may be used in various forms that depend on the nature of the polymer and the desired properties. For example, in order to obtain good dispersion in the polymer, a phosphinic acid salt may be in the form of fine particles.

Compound F2 is a product of reaction between phosphoric acid and melamine and/or a product of reaction between phosphoric acid and a condensed melamine product. Various compounds F2 may be used in combination. The condensed melamine products are, for example, melam, melem or melom. It is also possible to use even more condensed compounds. Preferably, the compound F2 may be chosen, for example, from the group consisting of the following reaction products: melamine polyphosphate, melam polyphosphate and melem polyphosphate, or a mixture thereof. It is particularly preferable to use a melamine polyphosphate having chain lengths of greater than 2 and in particular greater than 10.

These compounds are especially described in patent Wo 98/39306. The compounds F2 may also be obtained via processes other than those based on the direct reaction with a phosphoric acid. For example, melamine polyphosphate may be prepared by reaction of melamine with polyphosphoric acid (see WO 98/45364), but also by condensation of melamine phosphate and of melamine pyrophosphate (see WO 98/08898).

The fire-resistant system of the present invention most preferably comprises a compound F1 of formula (VI) in which $R_6=R_7=$ethyl, M=aluminum and Z=3; and a compound F2: melamine polyphosphate. The weight ratio of the compounds F1 and F2 is, respectively, 3:2.

The composition according to the invention may also comprise reinforcing fillers that are well known to those skilled in the art and chosen, for example, from the group comprising glass fibers, carbon fibers, mineral fibers, ceramic fibers, heat-resistant organic fibers, for instance polyphthalamide fibers, and mineral fillers such as wollastonite, kaolin, clay, silica and mica, and mineral nanofillers such as montmorillonite and $\alpha$-ZrP; or mixture thereof. Glass fibers are particularly preferred according to the invention. The glass fibers that are preferably used are glass fibers for polyamide, for example having a mean diameter of between 5 and 20 µm and preferably between 10 and 14 µm, for instance the glass fibers CS123D-10C (Owens Corning Fibreglass), CS1103 (Owens Corning Fibreglass) and CS983 (Vetrotex) and CS99B (Vetrotex).

The reinforcing fillers may represent from 0 to 80%, preferably from 5% to 55% and even more preferably from 10% to 40% by weight relative to the total weight of the composition.

The composition according to the invention may also comprise one or more additives usually used by a person skilled in the art in the polyamide-based compositions used for the manufacture of molded articles. Thus, examples of additives that may be mentioned include heat-stabilizers, molding agents such as calcium stearate, UV stabilizers, antioxidants, lubricants, abrasion reducers, pigments, colorants, plasticizers, laser etching promoters or resilience modifiers. By way of example, the antioxidants and heat stabilizers are, for example, alkaline halides, copper halides, sterically hindered phenolic compounds, organic phosphites and aromatic amines. The UV stabilizers are generally benzotriazoles, benzophenones or HALS in combination with antioxidants.

The composition according to the invention may also comprise one or more fire-resistant agents or synergists for the fire-resistant system, for instance those chosen from the following group: inorganic compounds and/or mineral products chosen from: zeolites, ceramic powder, magnesium hydroxide, hydrotalcites, magnesium carbonates and other alkaline-earth metal carbonates, zinc oxide, zinc stannate, zinc hydroxystannate, zinc phosphate, zinc borate, zinc sulfide, aluminum hydroxide, aluminum phosphate and red phosphorus, organonitrogen compounds belonging to the triazine class, such as melamine or derivatives thereof, for instance melamine cyanurate, melamine phosphates, polyphosphates and pyrophosphates and melem, and organophosphorous acids and salts thereof. These agents are especially mentioned in U.S. Pat. Nos. 6,344,158, 6,255,371 and 6,365,071.

The present invention also relates to a process for manufacturing a fire-resistant composition according to the invention, in which at least one star polyamide and a fire-resistant system as described above are mixed together, for example by melt-extrusion.

The mixing may be performed in the melt, for example in a single-screw or twin-screw extruder, or by mixing without passing to the melt, for example in a mechanical mixer. The compounds may be introduced simultaneously or successively. Any means known to those skilled in the art concerning the introduction of the various compounds of a thermoplastic composition may be used. An extrusion device in which the material is heated, subjected to a shear force and conveyed is generally used. Such devices are entirely familiar to those skilled in the art. The composition according to the invention, when it is prepared using an extrusion device, may be conditioned in the form of granules or used directly for forming an article.

The present invention also relates to a process for manufacturing an article by forming a composition according to the invention via a process chosen from the group comprising an extrusion process, such as the extrusion of sheets and films, molding, such as compression-molding, injection, such as injection-molding, and spinning.

The present invention is particularly suitable for the manufacture of articles used in the motor vehicle industry, in electrical or electronic connection, such as circuit-breaker elements, switches, connectors or the like.

EXPERIMENTAL SECTION

The compounds used are the following:

PA 6: PA 6 with a viscosity index of 140 ml/g (ISO 307, formic acid), and an Mn of 17 600 g/mol (by GPC);

PA 66: PA 66 with a viscosity index of 140 ml/g (ISO 307, formic acid), and an Mn of 17 600 g/mol (by GPC);

branched PA: star PA 6 obtained by copolymerization of caprolactam of formula (IV) with 0.5 mol % of 2,2,6,6-tetra($\beta$-carboxyethyl)cyclohexanone (polyfunctional compound of formula (V)) relative to the total number of moles of the polyamide. The polyamide has a melt flow index (MFI) of 40 g/10 minutes (according to ASTM standard D1238, at a temperature of 275° C. under a load of 325 g), and an Mn of 18 000 g/mol (by GPC);

FRS: the fire-resistant system comprises a compound F1 of formula (VI) in which $R_6=R_7=$ethyl, M=aluminum and Z=3; and a compound F2: melamine polyphosphate. The weight ratio of compounds F1 and F2 is, respectively, 3:2.

Glass fibers CS123D-10C (Owens Corning Fibreglass, Belgium);

Melem: Delamin® 450 (Delacal, England);

Zinc borate: Firebrake® ZB (US Borax, USA);

Calcium stearate.

EXAMPLE 1

The compositions are prepared by mixing together the components in proportions indicated in the examples, on a Werner & Pfleiderer ZSK 30 twin-screw extruder, with a screw speed of 250 rpm and a throughput of 15 kg/h. Temperatures of about 240° C. are used for PA 6. Temperatures of about 270° C. are used for PA 66.

Glass fibers and the mineral compounds are added to the mixture at the neck of the extruder.

The granules are dried and molded on an Arburg 320 M500-210 injection-molding machine at a temperature of 240° C. (PA 6 and branched PA) or of 270° C. (PA 66) and then molded at 80° C.

The properties are determined on specimens, according to the following methods:

The flame resistance is measured according to the test UL-94 ("Underwriters Laboratories"). This test is performed with specimens 1.6 mm and 0.8 mm thick, after conditioning for 48 hours at 50% RH (relative humidity) and 168 hours at 70° C. The result is coded as follows:

N.C.: not classified (low fire resistance)

V.2: the mean combustion time is less than 25 seconds, the maximum combustion time is less than 30 seconds (self-extinction); drop of polyamide ignites cotton V-1: mean combustion time is less than 25 seconds, maximum combustion time is less than 30 seconds (self-extinction); no ignition of cotton by the drop V-0: mean combustion time is less than 5 seconds, maximum combustion time is less than 10 seconds (self-extinction); no ignition of cotton

|  | V0 | V1 | V2 |
|---|---|---|---|
| Max. combustion time (s) | 10 | 30 | 30 |
| Mean combustion time (s) | 5 | 25 | 25 |
| Ignition of cotton by drop | No | No | Yes |

The combustion times of the compound in the test UL-94 are measured in seconds.

The glowing-wire resistance (GWT) is measured according to standard IEC 695-2-1 on specimens 1.5 mm and 1.0 mm thick. The results at different temperatures are classified as follows:

| NI | No ignition or no sustained ignition |
|---|---|
| Passes | Ignition during application of the glowing wire, but self-extinction within 30 seconds of removing said glowing wire. No ignited drops. |
| Fails | Ignition during the application of the glowing wire and no self-extinction within 30 seconds of removing said glowing wire, or formation of ignited drops. |

The mechanical properties are determined according to the following methods:

CHARPY impact strength according to standards ISO 179\1eA and ISO 179\1eU.

Melt flow index (MFI) measured at 275° C. according to standard ISO 1133, with a 2.16 kg load. The (MFI) of the branched PA is obtained at 235° C.

The tracking resistance index (PTI) according to standard IEC112.

The weight loss of the compositions obtained is measured via thermogravimetric analysis. The heat stability is compared by measuring the weight loss via the TGA isotherm process at 300° C. (temperature: 50° C. to 300° C., with 100° C./minute), performed with the TGA Perkin Elmer GA 7.

The properties of the compositions prepared above are collated in table 1.

TABLE 1

|  |  | Test 1 | Comparative test 2 | Comparative test 3 |
|---|---|---|---|---|
| Polyamide | % | Branched PA 54.75 | PA 6 54.75 | PA 66 54.75 |
| FRS | % | 15 | 15 | 15 |
| Calcium stearate | % | 0.25 | 0.25 | 0.25 |
| Glass fiber CS 123D-10C | % | 30 | 30 | 30 |
| Charpy ISO (notched) | kJ/m$^2$ | 9.4 | 8.9 | 8.3 |
| Charpy ISO (non-notched) | kJ/m$^2$ | 71 | 67 | 69 |
| MFI | g/10 min | 15.6 | 10.4 | 6.9 |
| PTI 500 V |  | passes | passes | fails |
| UL94 1.6 mm |  | V0 | V0 | V0 |
| Combustion time (maximum/mean) | s | 5/3.3 | 6/3.2 | 5/2.8 |
| UL94 0.8 mm |  | V0 | V1 | V0 |
| Combustion time (maximum/mean) | s | 6/2.4 | 14/6.8 | 5/3.3 |
| GWT 1.0 mm 960° C. |  | passes | passes | fails |
| GWT 1.5 mm 960° C. |  | passes | passes | passes |
| Weight loss TGA isotherm, 300° C./N$_2$ |  |  |  |  |
| 5 minutes | % | 0.10 | 0.45 | 0.85 |
| 10 minutes | % | 0.40 | 1.00 | 1.55 |
| 15 minutes | % | 1.05 | 1.55 | 1.90 |
| Color consistency during molding |  | good | good | poor |

By comparison with the composition of test 1 according to the invention, that of the comparative test 2 shows poor results in the test UL94 (0.8 mm), and that of comparative test 3 shows poor results in the GWT test (1.0 mm). The composition of test 1 with the branched PA is the most stable, with the lowest weight loss. The composition of the comparative test 3 with PA 66 is the least stable, with the greatest weight loss. The composition of the comparative test 3 also shows black scratches during the molding of thin specimens.

EXAMPLE 2

Table 2 below shows tests in which the FRS was tested in the presence of other synergistic additives (mineral compounds: zinc borate; nitrogen compounds: melem) and also 30% by weight of glass fiber in branched PA-based compositions.

TABLE 2

|  |  | Test 1 | Test 4 | Test 5 | Test 6 | Test 7 |
|---|---|---|---|---|---|---|
| Branched polyamide | % | 54.75 | 57.75 | 52.75 | 52.75 | 52.75 |
| FRS | % | 15 | 12 | 12 | 12 | 10 |
| Melem | % |  |  |  | 5 | 5 |
| Zinc borate | % |  |  | 5 |  | 2 |
| Calcium stearate | % | 0.25 | 0.25 | 0.25 | 0.25 | 0.25 |
| Glass fibers | % | 30 | 30 | 30 | 30 | 30 |
| Charpy ISO (notched) | kJ/m² | 9.3 | 9.8 | 7.6 | 8.3 | 8.0 |
| Charpy ISO (non-notched) | kJ/m² | 72 | 77 | 57 | 68 | 59 |
| MFI | g/10' | 13.2 | 15.3 | 14.8 | 12.8 | 13.2 |
| PTI 500 V |  | passes | passes | passes | passes | passes |
| UL94 1.6 mm |  | V0 | V0 | V1 | V0 | V1 |
| Combustion time max./mean | s | 5/3.3 | 15/7.3 | 13/6.6 | 10/4.2 | 8/5.3 |
| UL94 0.8 mm |  | V0 | NC* | NC* | V1 | V2 |
| Combustion time max./mean | s | 6/2.4 | — | — | 13/5.4 | 12/6.8 |
| GWT 1.0 mm | 960° C. | passes | fails | fails | fails | passes |
| GWT 1.5 mm | 960° C. | passes | fails | fails | passes | passes |
| GWT 1.0 mm | 750° C. | NI | passes | NI | fails | NI |
| GWT 1.5 mm | 750° C. | NI | passes | NI | NI | NI |

Note:
NC* - sample burned after conditioning for 48 h/50% RH.

Thus, the compositions according to the invention make it possible to obtain articles with very satisfactory mechanical behavior and also low ignition and good fire resistance, when compared with the articles obtained from compositions of the prior art comprising linear polyamides.

The invention claimed is:

1. A fire-resistant composition comprising at least:
   a) a star polyamide-based polyamide matrix comprising at least macromolecular chains of formula (I):

$$R_1\text{—}[\text{-}A\text{-}X\text{—}(\text{—}Y\text{—}R_2\text{-}Z\text{-})_n\text{—}R_3]_m \quad (I)$$

and, optionally, macromolecular chains of formula (II):

$$R_4\text{—}[\text{—}Y\text{—}R_2\text{-}Z\text{-}]_p\text{—}R_3 \quad (II)$$

wherein:
   Y is the radical:

when X and Z represent the radical:

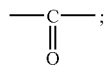

Y is the radical:

when X and Z represent the radical:

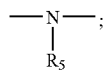

A is a covalent bond or an aliphatic hydrocarbon-based radical optionally having hetero atoms and having from 1 to 20 carbon atoms;
   $R_1$ is a linear or cyclic, aromatic or aliphatic hydrocarbon-based radical having at least 2 carbon atoms, and optionally having hetero atoms;
   $R_2$ is an aliphatic or aromatic, branched or unbranched hydrocarbon-based radical having from 2 to 20 carbon atoms;
   $R_3$ and $R_4$ are independently selected from the group consisting of hydrogen, an —OH radical and/or a hydrocarbon-based radical having at least one group:

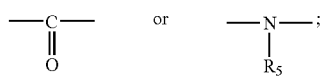

$R_5$ represents hydrogen or a hydrocarbon-based radical having from 1 to 6 carbon atoms;
   m represents an integer between 3 and 8;
   n represents an integer between 50 and 200; and
   p represents an integer between 50 and 200; and
   b) a fire-resistant composition comprising at least; a compound (F1) of formula (VI):

wherein:
   $R_6$ and $R_7$ are identical or different and represent a linear or branched alkyl chain having from 1 to 6 carbon atoms and/or an aryl radical;
   M is selected from the group consisting of a calcium, magnesium, aluminum and/or zinc ion;
   Z represents 2 or 3; and
   a compound (F2), which is a product of reaction between phosphoric acid and melamine and/or a product of reaction between phosphoric acid and a condensed melamine product.

2. The composition as claimed in claim 1, comprising from 30% to 99% by weight of the star polyamide relative to the total weight of the composition.

3. The composition as claimed in claim 1, comprising from 1% to 70% by weight of the fire-resistant system relative to the total weight of the composition.

4. The composition as claimed in claim 1, wherein the radical $R_1$ is a cycloaliphatic, arylaliphatic or linear aliphatic group, with a mass ratio between the weight of polymer chains of formula (I) and the total weight of polymer chains of formulae (I) and (II) being between 0.10 and 1.

5. The composition as claimed in claim 1, wherein the radical $R_1$ is an aromatic radical, with a mass ratio between the weight of polymer chains of formula (I) and the total weight of polymer chains of formulae (I) and (II) being less than 1.

6. The composition as claimed in claim 1, wherein $R_2$ is a pentamethylene radical.

7. The composition as claimed in claim 1, wherein $R_1$ represents a cyclohexanonetetrayl, 1,1,1-triylpropane, 1,2,3-triylpropane or:

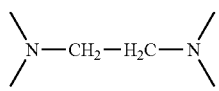

8. The composition as claimed in claim 1, wherein A represents a methylene, polymethylene or polyoxyalkylene group.

9. The composition claimed in claim 1, wherein the phosphinic acid of compound F1 is dimethylphosphinic acid, ethylmethylphosphinic acid, diethylphosphinic acid, methyl-n-propylphosphinic acid, or a mixture thereof.

10. The composition as claimed in claim 1, wherein the compound F2 is melamine polyphosphate, melam polyphosphate, melem polyphosphate, or a mixture thereof.

11. The composition as claimed in claim 1, further comprising from 0 to 80% by weight of reinforcing fillers relative to the total weight of the composition.

12. The composition as claimed in claim 11, wherein said reinforcing fillers are glass fibers, carbon fibers, mineral fibers, ceramic fibers, heat-resistant organic fibers, polyphthalamide fibers, mineral fillers, wollastonite, kaolin, clay, silica, mica, mineral nanofillers, montmorillonite or α-Zr phosphate.

13. The composition as claimed in claim 1, further comprising fire-resistant agents or fire-resistant-system synergists selected from the group consisting of inorganic compounds and/or mineral products.

14. The composition as claimed in claim 13, wherein the fire-resistant agents or fire-resistant-system synergists are zeolites, ceramic powder, magnesium hydroxide, hydrotalcites, magnesium carbonates, zinc oxide, zinc stannate, zinc hydroxystannate, zinc phosphate, zinc borate, zinc sulfide, aluminum hydroxide, aluminum phosphate, red phosphorus, organonitrogen compounds of the triazine class, melamine, melamine cyanurate, melamine phosphates, polyphosphates, pyrophosphates or organophosphorous acids.

15. A process for manufacturing a fire-resistant composition, comprising the steps of:

1) mixing together:

a) a star polyamide-based polyamide matrix comprising at least macromolecular chains of formula (I):

$$R_1\text{—}[\text{-A-X-}(\text{—Y—}R_2\text{-Z-})_n\text{—}R_3]_m \quad (I)$$

and optionally macromolecular chains of formula (II):

$$R_4\text{—}[\text{—Y—}R_2\text{-Z-}]_p\text{—}R_3 \quad (II)$$

wherein:

Y is the radical:

when X and Z represent the radical:

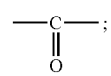

Y is the radical:

when X and Z represent the radical:

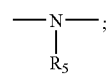

A is a covalent bond or an aliphatic hydrocarbon-based radical optionally having hetero atoms and having from 1 to 20 carbon atoms;

$R_1$ is a linear or cyclic, aromatic or aliphatic hydrocarbon-based radical having at least 2 carbon atoms and optionally having hetero atoms;

$R_2$ is an aliphatic or aromatic, branched or unbranched hydrocarbon-based radical having from 2 to 20 carbon atoms;

$R_3$ and $R_4$ independently represent hydrogen, an —OH radical and/or a hydrocarbon-based radical having at least one group:

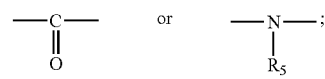

$R_5$ represents hydrogen or a hydrocarbon-based radical having from 1 to 6 carbon atoms;

m represents an integer between 3 and 8;

n represents an integer between 50 and 200;

p represents an integer between 50 and 200; and b) a fire-resistant composition comprising at least:

a compound (F1) of formula (VI):

wherein:

$R_6$ and $R_7$ are identical or different and represent a linear or branched alkyl chain having from 1 to 6 carbon atoms and/or an aryl radical;

M represents a calcium, magnesium, aluminum and/or zinc ion;

Z represents 2 or 3; and a compound (F2), which is a product of reaction between phosphoric acid and melamine and/or a product of reaction between phosphoric acid and a condensed melamine product; and 2) recovering the fire-resistant composition obtained in step 1).

16. An article made by the process of forming a composition as claimed in claim 1, wherein said forming is an extrusion process, a molding process, an injection process or a spinning process.

* * * * *